(12) United States Patent
Helstern et al.

(10) Patent No.: US 7,299,725 B2
(45) Date of Patent: Nov. 27, 2007

(54) TORQUE FASTENING DEVICES AND APPARATUSES

(75) Inventors: Gary C. Helstern, Newtown, CT (US);
John Cronin, Mahopac, NY (US);
Charles E. Duheis, Newtown, CT (US)

(73) Assignee: Diba Industries, Inc., Danbury, CT (US)

( * ) Notice: Subject to any disclaimer, the term of this patent is extended or adjusted under 35 U.S.C. 154(b) by 0 days.

(21) Appl. No.: 11/369,532

(22) Filed: Mar. 7, 2006

(65) Prior Publication Data

US 2007/0209487 A1 Sep. 13, 2007

(51) Int. Cl.
*B25B 23/153* (2006.01)
*B25B 23/14* (2006.01)
(52) U.S. Cl. .......................................... 81/471; 81/468
(58) Field of Classification Search ................. 81/471, 81/467, 64
See application file for complete search history.

(56) References Cited

U.S. PATENT DOCUMENTS

| | | | | |
|---|---|---|---|---|
| 2,743,640 A | * | 5/1956 | Verkuil ........................... 81/64 |
| 3,191,486 A | * | 6/1965 | Gibbens ......................... 411/4 |
| 3,709,087 A | * | 1/1973 | Stone, Jr. ....................... 411/6 |
| 3,718,065 A | | 2/1973 | Liber | |
| 3,742,808 A | | 7/1973 | Trembley | |
| 3,916,757 A | | 11/1975 | Wilson | |
| 3,929,054 A | * | 12/1975 | Gutshall ......................... 411/5 |
| 3,937,121 A | | 2/1976 | Schubert | |
| 4,068,555 A | * | 1/1978 | Volkman ......................... 411/2 |
| 4,215,600 A | * | 8/1980 | Kesselman .................... 81/471 |
| 4,258,606 A | * | 3/1981 | Wilson ......................... 411/406 |
| 4,836,727 A | * | 6/1989 | Volkmann ....................... 411/4 |
| 4,930,951 A | | 6/1990 | Gilliam | |
| 4,958,970 A | | 9/1990 | Rose et al. | |
| D313,471 S | * | 1/1991 | Bremer et al. ............. D24/147 |
| 4,988,246 A | | 1/1991 | Yoshida et al. | |
| 5,158,458 A | * | 10/1992 | Perry .......................... 433/141 |
| 5,176,050 A | * | 1/1993 | Sauer et al. ................... 81/471 |
| 5,188,494 A | | 2/1993 | Hatin | |
| 5,295,831 A | | 3/1994 | Patterson et al. | |
| 5,297,458 A | * | 3/1994 | Smith et al. ................ 81/124.3 |
| 5,368,480 A | * | 11/1994 | Balfour et al. .............. 433/141 |
| 5,571,014 A | * | 11/1996 | Gregory et al. ............. 433/141 |
| 5,913,648 A | | 6/1999 | Lin | |
| 5,996,408 A | | 12/1999 | TenBrink et al. | |
| 6,036,421 A | | 3/2000 | Demaray | |
| 6,039,408 A | | 3/2000 | Alvarez | |
| 6,071,051 A | | 6/2000 | Reed | |
| 6,244,804 B1 | | 6/2001 | Hodge | |
| 6,270,302 B1 | | 8/2001 | Lyons | |
| 6,308,598 B1 | * | 10/2001 | O'Neil ......................... 81/467 |
| 6,332,383 B1 | * | 12/2001 | Komatsu ...................... 81/471 |
| 6,439,086 B1 | * | 8/2002 | Bahr ........................... 81/467 |
| 6,494,659 B1 | | 12/2002 | Lutkus et al. | |

(Continued)

FOREIGN PATENT DOCUMENTS

GB 2219540 A * 12/1989

*Primary Examiner*—David B Thomas
(74) *Attorney, Agent, or Firm*—Dinsmore & Shohl LLP

(57) ABSTRACT

Fastening devices and apparatuses for providing an appropriate amount of torque in a fastening system. Particularly, fastening devices and apparatuses configured to inform a user when an appropriate amount of torque as been used when fastening the fastening device to a designated object.

19 Claims, 10 Drawing Sheets

U.S. PATENT DOCUMENTS

| | | |
|---|---|---|
| 6,499,358 B1 | 12/2002 | Hogan et al. |
| 6,588,306 B1 * | 7/2003 | Grossman et al. ............ 81/467 |
| 6,688,829 B1 | 2/2004 | Popovich et al. |
| 6,802,680 B1 * | 10/2004 | Rubenstein ..................... 411/7 |
| 7,137,816 B2 * | 11/2006 | Gervais et al. ............. 433/173 |
| 2004/0226419 A1 * | 11/2004 | Morgan ........................ 81/471 |

* cited by examiner

TORQUE FASTENING DEVICES AND APPARATUSES

TECHNICAL FIELD

The present invention relates generally to fastening devices and apparatuses which inform a user when a predetermined torque has been applied to a fastener in a fastening system. In one exemplary embodiment, a fastening device includes a body and an extension member configured to change orientation with respect to the body once a predetermined torque has been reached. In another exemplary embodiment, the apparatus includes a tool configured to change orientation once a predetermined torque has been applied to a fastening device.

BACKGROUND OF THE INVENTION

Providing mechanisms to allow individuals to easily determine when a sufficient amount of torque has been applied in a fastening system in certain applications has numerous advantages. The appropriate amount of torque is usually never applied to a fastener in a fastening system. In fact, many times too little torque is applied to a fastener or the fastener is over torqued. Most fasteners are applied in systems with tools such as screwdrivers, drills, or perhaps simply by hand. However, in utilizing such tools, individuals have no precise indication when sufficient torque has been applied to the fastener.

In some environments, many typical fasteners will not effectively work. Particularly, in environments where fasteners are used in association with small scale equipment or are associated with glass where the precision necessary for applying torque to the fastener is much more important. For example, analytical applications, such as those commonly used in laboratory environments, require increased precision when it comes to the amount of torque applied for testing procedures and related applications because of the nature and sensitivity of the equipment being used.

SUMMARY OF THE INVENTION

Accordingly, it is an object of the present invention to provide fastening devices and apparatuses. It is a further object to provide fastening devices and apparatuses each configured to inform a user when a predetermined torque has been applied thereto.

In one exemplary embodiment, the invention is directed to a fastening device having an upper portion and a lower portion. The upper portion includes a body and an extension member. The extension member is attached to the body and configured to change orientation with respect to the body under a predetermined force. The lower portion is attached to the upper portion and includes a fastening member configured to be fastened to an object.

In another exemplary embodiment, the invention is directed to an apparatus having a fastening device and a tool. The fastening device includes a body, a fastening member and a channel. The channel substantially extends through the body and the fastening member. The tool includes a first end and a second end. The tool is configured to interface with the body of the fastening device and allow a user to rotate the fastening device to apply up to a predetermined force to operably fasten the fastening device to an object. The second end is configured to change orientation with respect to the fastening device at the predetermined force.

In a further exemplary embodiment, the invention is directed to an apparatus having a fastening device and a tool. The fastening device includes a body, a fastening member and a channel. The channel substantially extends through the body and the fastening member. The tool includes a first end and a second end. The second end includes at least one extension member. The tool is configured to interface with the body of the fastening device and allow a user to rotate the fastening device to apply up to a predetermined force to operably fasten the fastening device to an object. The extension member is configured to change orientation with respect to the tool at the predetermined force.

In yet another exemplary embodiment, the invention is directed to an apparatus having a fastening device and a tool. The fastening device includes a body and a fastening member. The body has an upper surface including a recessed region and inward members extending into the recessed region. The inward members are configured to change orientation with respect to the fastening device. The tool includes a first end and a second end. The tool is configured to interface with the inward members of the body and allow a user to rotate the fastening device to apply up to a predetermined force to operably fasten the fastening device to an object. The inward members are configured to change orientation with respect to the recessed region at the predetermined force.

The present fastening devices and apparatuses provide a simple way to allow a user to determine when a predetermined amount of force (i.e., torque) has been applied to a fastener. In some embodiments, the fastening devices utilize winged members or tools which are configured to deform or break providing an indication to the user that the appropriate torque has been applied to the fastener.

These and additional advantages of the present invention will be more readily apparent in view of the following detailed description.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Exemplary embodiments of the present invention and its operation are hereinafter described in detail in connection with the views and examples of FIGS. 1-12, wherein like numbers indicate the same or corresponding elements throughout the views.

Figure 1:
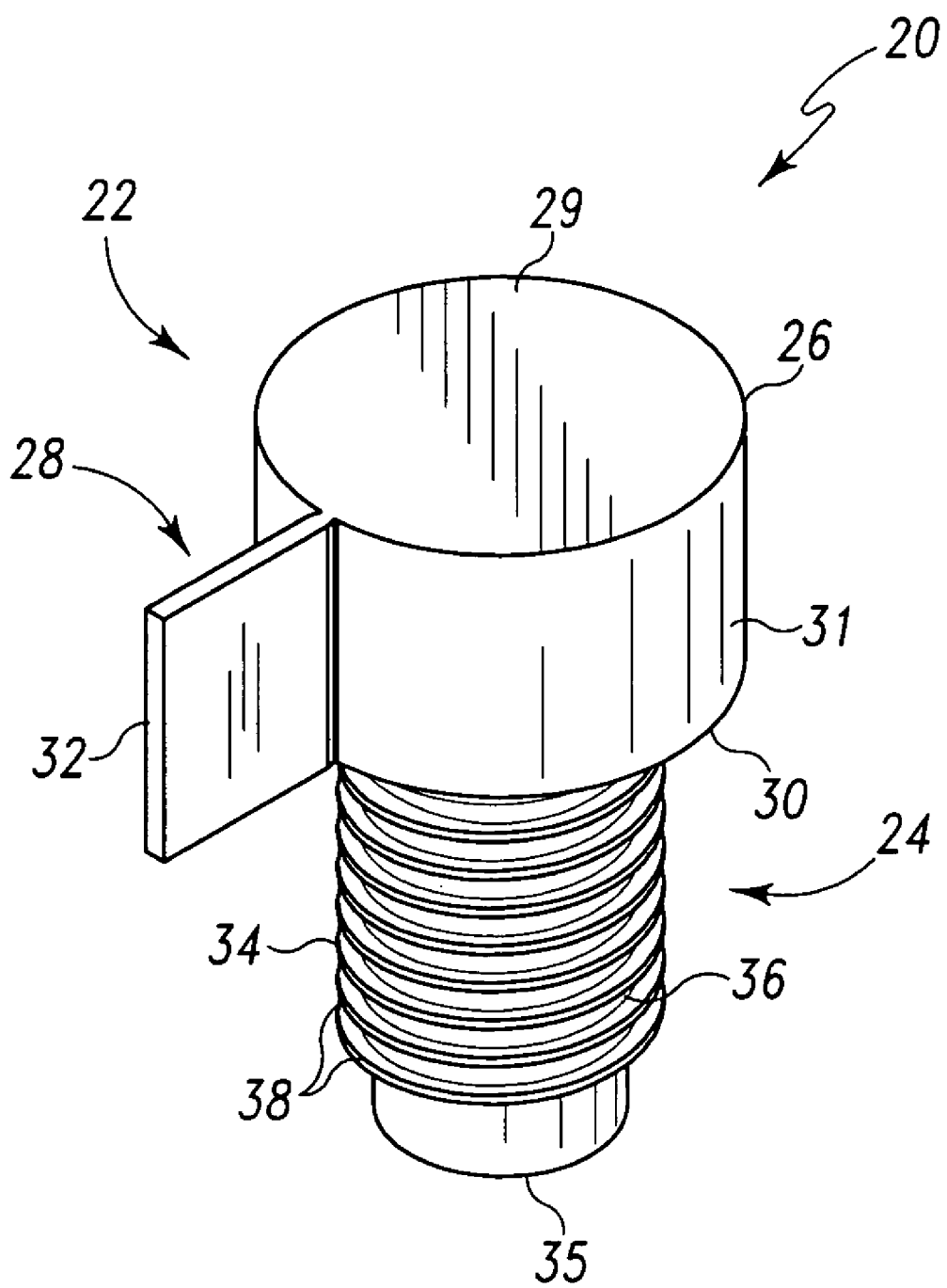
FIG. 1 depicts an isometric view of an exemplary embodiment of a fastening device having an upper portion and a lower portion.
Figure 2:
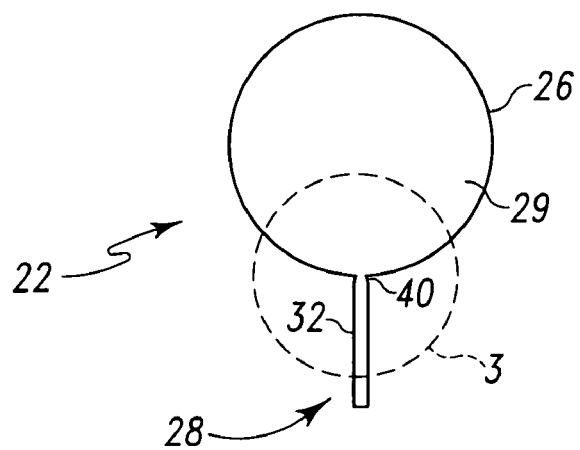
FIG. 2 illustrates a top orthogonal view of an exemplary embodiment of a fastening device having an extension member.

FIG. 1 illustrates an exemplary embodiment of a fastening device 20 (i.e., a bolt, screw, connector, etc.). The fastening device 20 includes an upper portion 22 and a lower portion 24. The upper portion 22 includes a body 26 and an extension member 28. The body 26 can have an upper surface 29, a lower surface 30 and an outer surface 31. The outer surface 31 of the body 26 extends around the periphery of the body 26. As illustrated in FIG. 1, the extension member 28 is attached to one side of the body 26. The extension member 28 is generally attached along at least a portion of the outer surface 31 of the body 26 of the fastening device 20. The extension member 28 generally takes the form of a winged member 32 extending away from the body 26. The extension member 28 can have a variety of different shapes, including, for example, a substantially rectangular shape, a square shape, a circular shape, and a variety of other generic shapes including irregular shapes. Such shapes are possible as long as a sufficient portion of the extension member 28 is attached to the outer surface 31 of the body 26.

The lower portion 24 of the fastening device 20 is attached to the upper portion 22 and includes a fastening member 34 configured to be fastened to an object (not shown). The fastening member 34 includes an end surface 35 and an outer periphery surface 36. The outer periphery surface 36 of the fastening member 34 extends around the periphery of the fastening member 34. In one exemplary embodiment, the fastening member 34 on the lower portion 24 of the fastening device 20 includes a threaded portion 38 around at least a portion of the outer periphery surface 36. The threaded portion 38 provides a means for the fastening device 20 to interface with and be fastened to the object.

Figure 3:
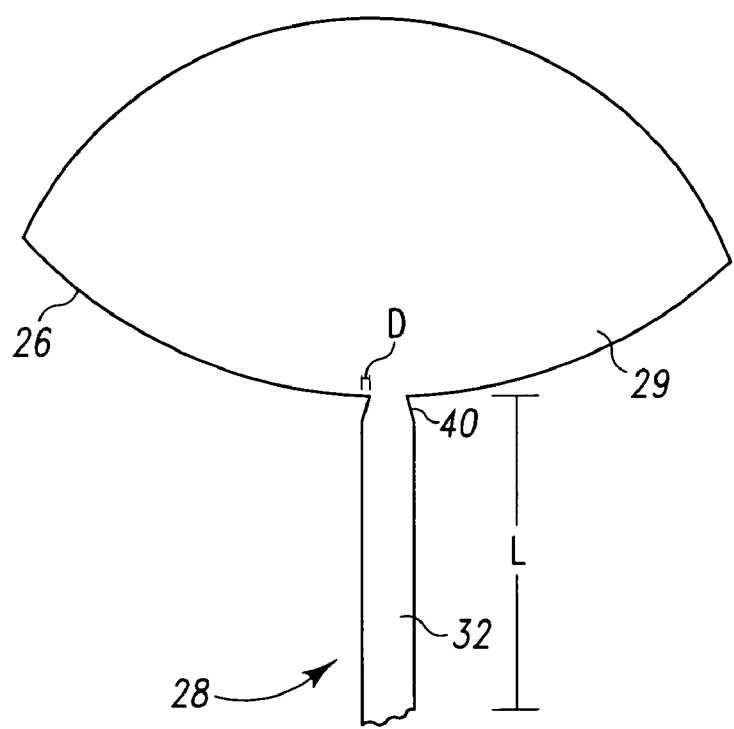
FIG. 3 depicts an enlarged sectional view of FIG. 2 illustrating the attachment of the extension member to a body of the fastening device.

The manner in which the extension member 28 is attached to the body 26 allows for the extension member 28 to be configured to change orientation with respect to the body 26 once a predetermined force has been applied. As shown in the exemplary embodiment of FIG. 2, the extension member 28 has a generally predetermined thickness up until the point where the extension member 28 is attached to the body 26. This is better illustrated in the enlarged view of FIG. 3, which depicts the attachment of the extension member 28 with the body 26. As shown, the thickness of the extension member 28 changes along a lateral portion of the extension member 28, whereby the thickness tapers (i.e., narrows) at the point where the extension member 28 attaches to the body 26 of the fastening device 20. This notched portion 40 permits the extension member 28 to have its orientation change with respect to the body 26 when a predetermined force is applied to extension member 28. The noticed portion 40 is configured to have a depth (D) such that when a predetermined force is applied to the extension member 28 by the user in rotating the fastening device 20, the extension member 28 undergoes its change in orientation. Although the notched portion 40 is shown in FIG. 3 where the extension member 28 connects with the body 26, in another exemplary embodiment, the notched portion 40 can occur at any point along the length (L) of the extension member 28 extending radially outward from the body 26. The amount of the predetermined force required to change the orientation of the extension member 28 can vary depending on the configuration of the notched portion 40 (for example, the depth (D) of the notched portion 40). In one exemplary embodiment, the predetermined force ranges from about 15 in-oz to about 40 in-oz. In another exemplary embodiment, the predetermined force ranges from about 20 in-oz to about 24 in-oz. When force is applied to the fastening device 20 by a user, the user is rotating the fastening device 20 as the fastening device 20 is attached to an object (not shown). When the predetermined force is reached, the extension member 28 undergoes a change in orientation relative to the body 26. This change in orientation refers to the extension member 28 bending or breaking away from said body 26. Once the predetermined force is substantially reached, the extension member 28 will begin to bend or break away from the body 26. This change in orientation informs the user that the appropriate amount of force has been applied and that the fastening device 20 has been properly attached to the object.

Figure 4:
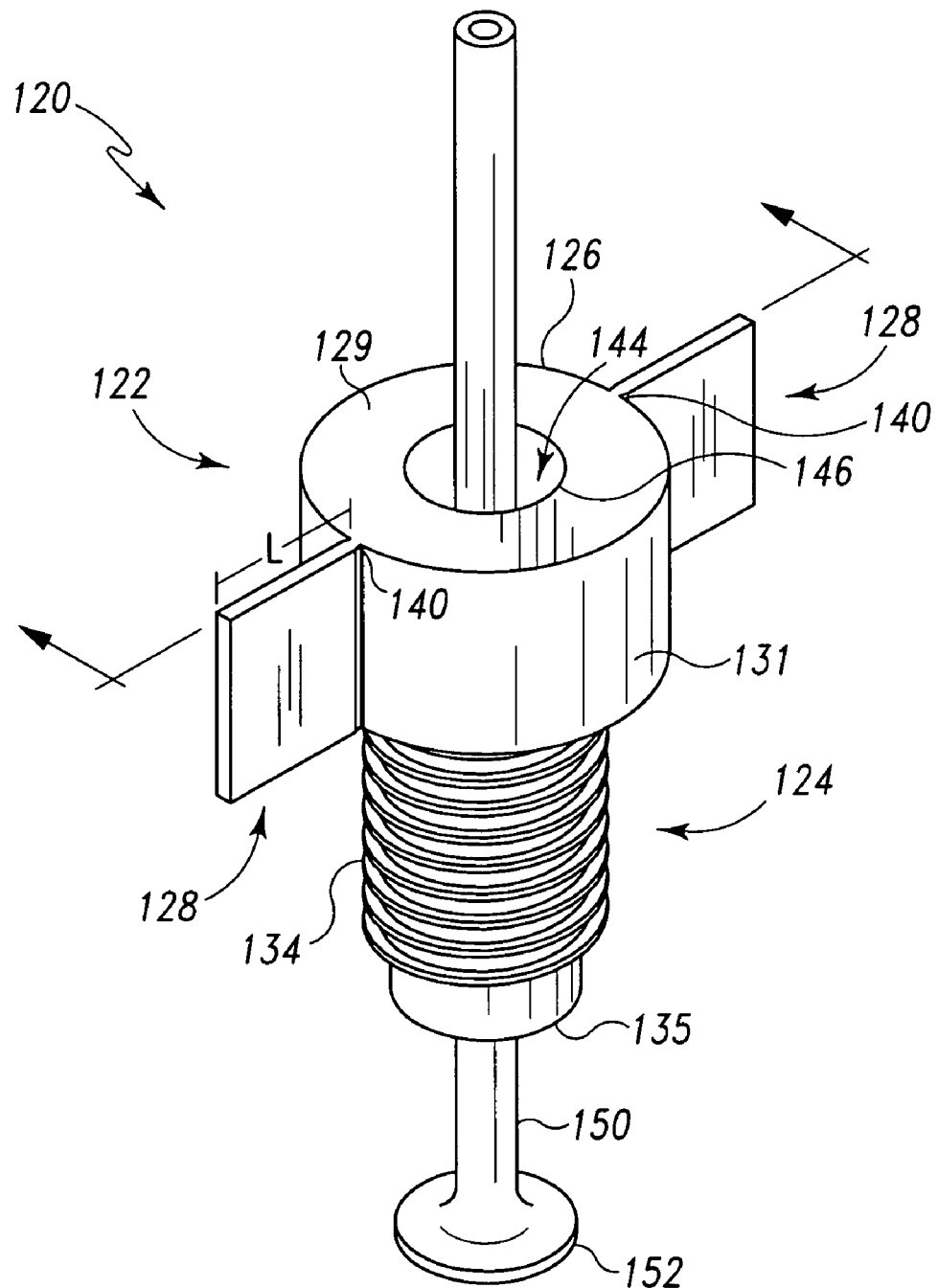
FIG. 4 illustrates an isometric view of an exemplary embodiment of a fastening device having two extension members.
Figure 5:
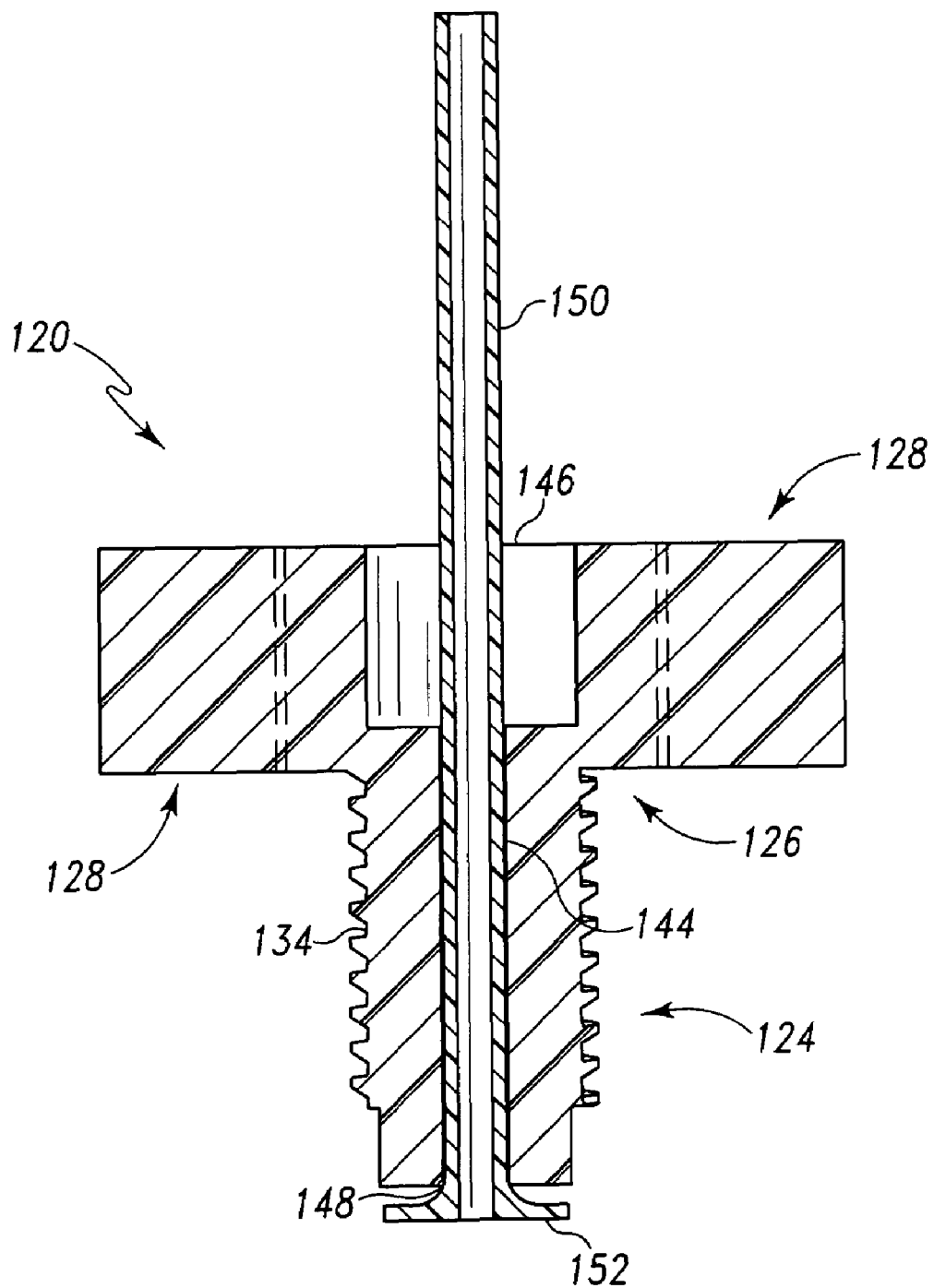
FIG. 5 depicts a cross-sectional view of FIG. 4 illustrating the channel within the fastening device containing a tubular device.

In another exemplary embodiment, as shown in FIG. 4, a fastening device 120 can include an upper portion 122 having a pair of extension members 128. Each of the extension members 128 has a generally predetermined thickness, and the thickness of the extension members 128 each respectively narrow as they attach to an outer surface 129 of a body 126 of the fastening device 120 forming notched portions 140. In this exemplary embodiment, the user rotates both extension members 128 until a predetermined force is reached, at which point one or both of the extension members 128 change orientation relative to the body 126, such that the extension members 128 either bend or break away from the body 126. Again, although FIG. 4 illustrates the notched portion 140 at the point where the extension member 128 connects with the body 126, in another exemplary embodiment, the notched portion 140 can be placed at any point along the length (L) of the extension member 128 extending radially outward from the body 126.

FIG. 4 also illustrates that in one exemplary embodiment the fastening device 120 can include a channel 144 which substantially extends from the upper portion 122 through a lower portion 124 of the fastening device 120. This channel 144 is more clearly described in FIG. 5 (a cross-sectional view of the fastening device of FIG. 4). The channel 144 extends from a first opening 146 in an upper surface 129 of the body 126 of the fastening device 120 through a fastening member 134 and exits at a second opening 148 in an end surface 135 of the fastening member 134 of the fastening device 120. In one exemplary embodiment, the channel 144 is designed to allow a tubular device 150 to be inserted into the channel 144. The tubular device 150 is configured to extend beyond the second opening 148 in the fastening member 134 to interface with the end surface 135 of the fastening member 134. This interface provides for a seal (not shown) when the fastening member 134 is operatively fastened to the object because the tubular device 150 contains a flanged end 152 which contacts at least part of the end surface 135 of the fastening member 134. In another exemplary embodiment, the fastening device 120 can include a sealing member (not shown) that provides a seal between the fastening member 134 and the object. The sealing member could include an o-ring, gasket, or any equivalent item designed to provide for a sealing interface between the fastening member 134 and the object.

Figure 6:
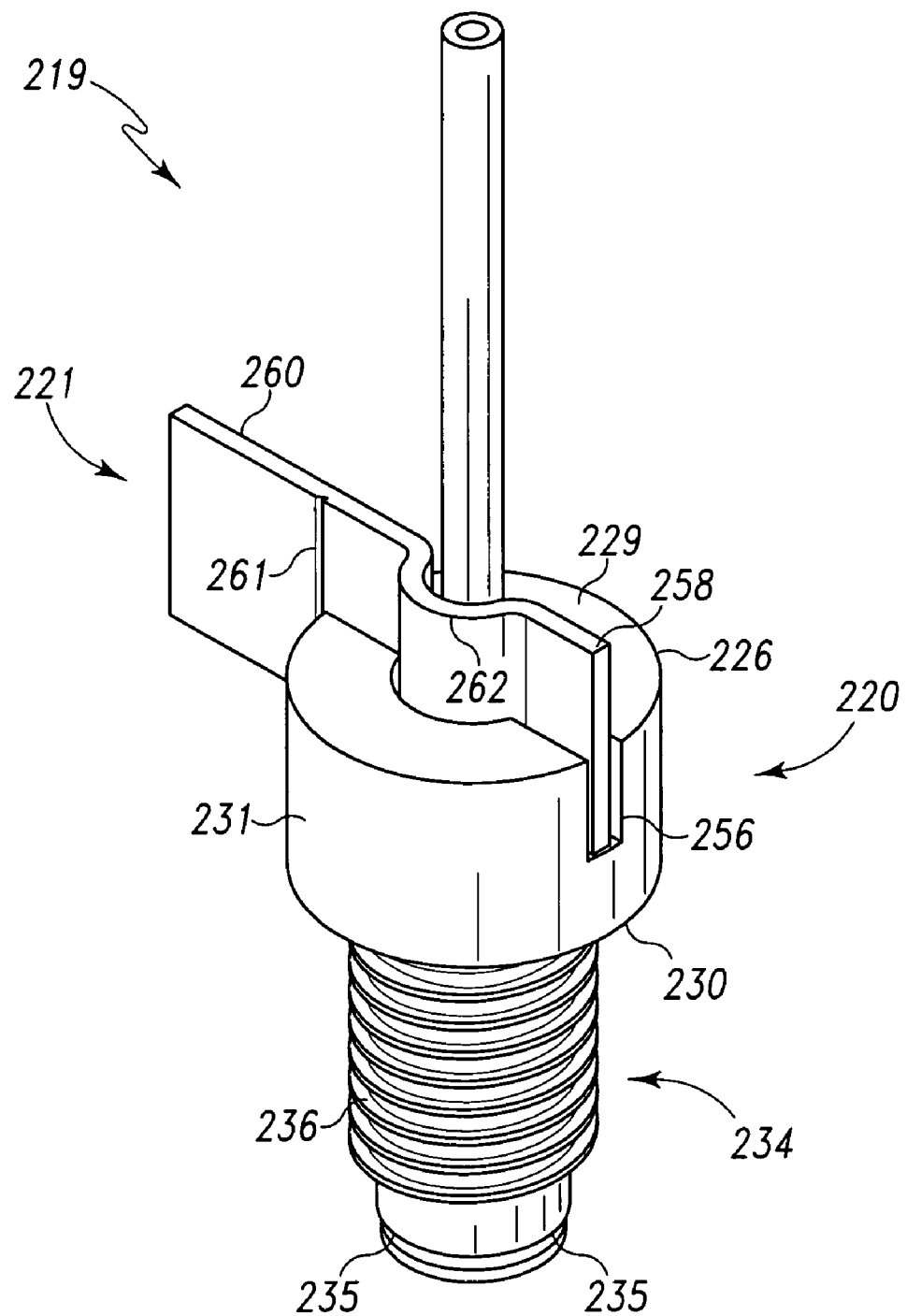
FIG. 6 illustrates an isometric view of an exemplary embodiment of an apparatus having a fastening device and a tool.
Figure 7:
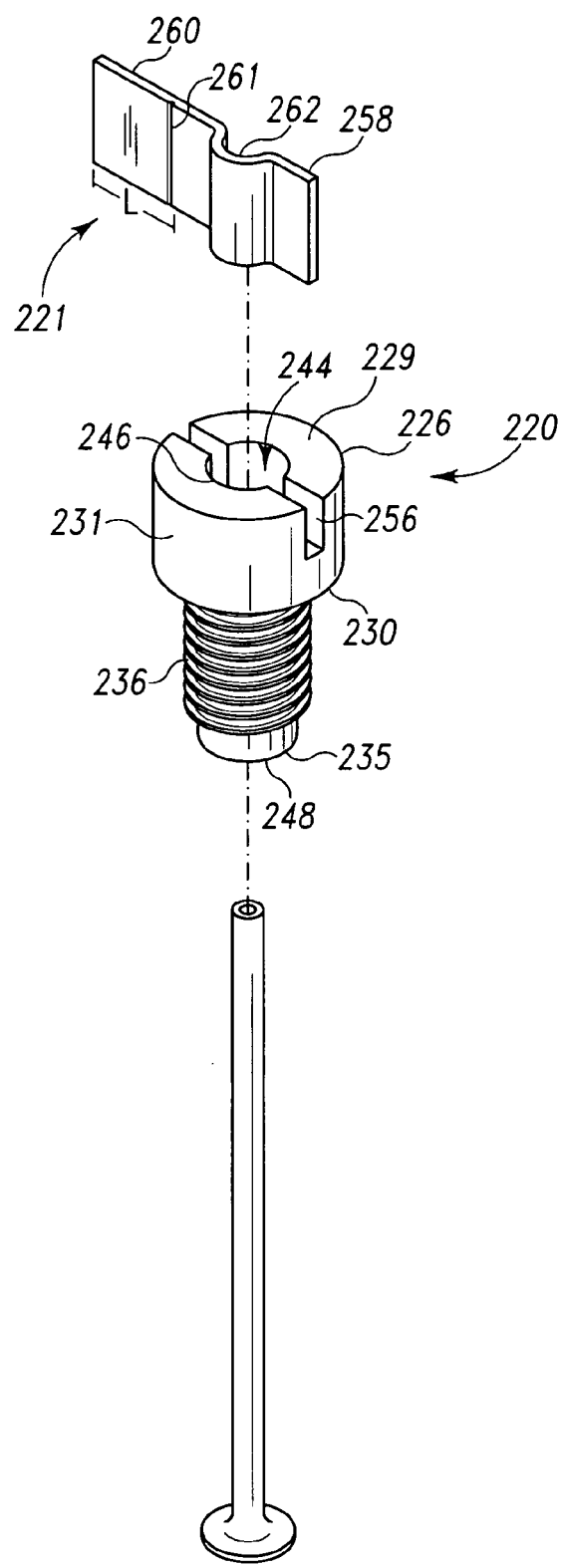
FIG. 7 depicts an exploded view of an exemplary embodiment of an apparatus including a fastening device and a tool.

As illustrated in the exemplary embodiment of FIG. 6, an apparatus 219 includes a fastening device 220 and a tool 221. The fastening device 220 includes a body 226, a fastening member 234 and a channel 244. The body 226 can have an upper surface 229, a lower surface 230 and an outer surface 231. The outer surface 231 of the body 226 extends around the periphery of the body 226. The fastening member 234 includes an end surface 235 and an outer periphery surface 236. The outer periphery surface 236 of the fastening member 234 extends around the periphery of the fastening member 234. The fastening device 220 is configured to be operatively attached and fastened to an object (not depicted). The channel 244 substantially extends through the body 226 and the fastening member 234. The channel 244 extends from a first opening 246 in the upper surface 229 of the body 226 of the fastening device 220 through the fastening member 234 and exits at a second opening 248 in the end surface 235 of the fastening member 234 of the fastening device 220.

Figure 8:
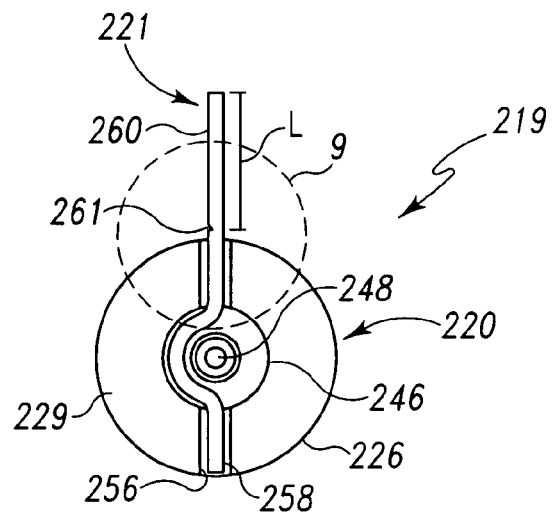
FIG. 8 illustrates an top orthogonal view of an exemplary embodiment of an apparatus.

The upper surface 229 of the body 226 of the fastening device 220, as shown in FIG. 6, includes a recess 256 configured to interface with the tool 221 of the apparatus 219, such that the tool 221 inserts into the recess 256 in the upper surface 229 of the body 226. The interface between the fastening device 220 and the tool 221 can more easily be understood from the exploded view of the exemplary embodiment shown in FIG. 7. The tool 221 is configured to interface with the body 226 of the fastening device 220 and allows a user to rotate the fastening device 22Q to apply up to a predetermined force to operably fasten the fastening device 220 to an object. The tool 221 includes a first end 258 and a second end 260. In one exemplary embodiment, the length (L) of the second end 260 of the tool 221 extends beyond the outer surface 231 to provide sufficient leverage to the user when rotating the tool 221, and thus, the fastening device 220. This can be more readily appreciated from FIG. 8, which illustrates a top view of the apparatus 219 where the tool 221 has been inserted into the recess 256 in the upper surface 229 of the fastening device 220. As depicted in FIG. 8, the length (L) of the second end 260 of the tool 221 extends beyond the upper surface 229 of the body 226. Moreover, the tool 221 includes a curved section 262 to permit the tool 221 to follow the path created by the recess 256 in order to avoid interfering with the first opening 246 of the channel 244.

Figure 9:
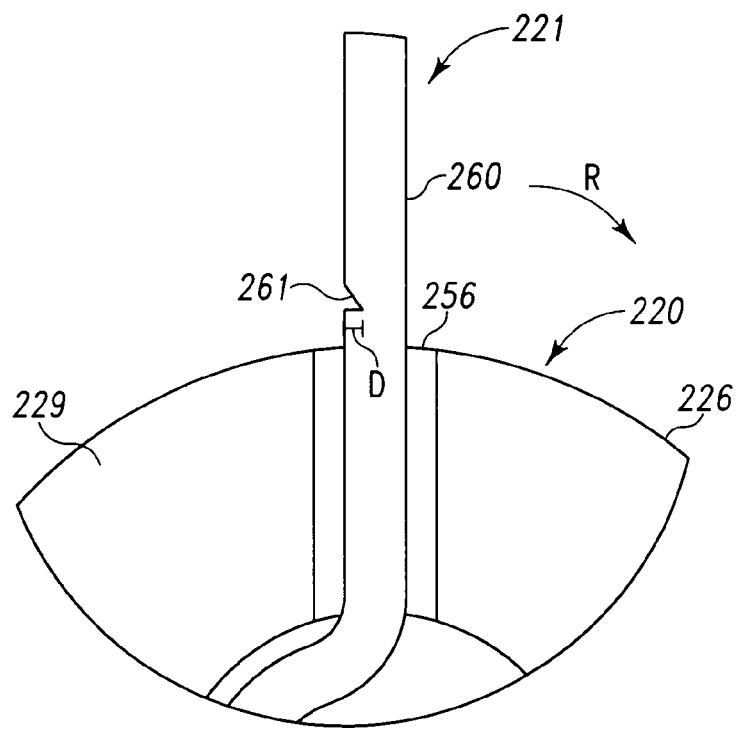
FIG. 9 depicts an enlarged sectional view of FIG. 8 illustrating one end of the tool having a slit.

FIG. 9 provides an enlarged view of FIG. 8, and provides a more clear illustration of the second end 260 of the tool 221 which includes a slit 261 which extending along at least one surface of the second end 260. The slit 261 is configured to have a depth (D) such that when a predetermined force is applied to the tool 221 by the user in rotating the fastening device 220, the second end 260 undergoes a change in orientation relative to the fastening device 220. This change in orientation includes the second end 260 bending or breaking away from the rest of the tool 221. As the user operably rotates the tool 221 in the designated direction (R), the fastening device 220 begins to undergo increased torque such that when the predetermined force (i.e., torque) is reached, the second end 260 (i.e., the portion of the tool 221 being held by the user) will change orientation. Thus, the second end 260 will bend or break away from the remainder of the tool 221 including the first end 258, thereby informing the user that the predetermined force has been reached and the fastening device 220 has been appropriately attached to the designated object. It is important to note, that the tool 221 can be independent and separate from the fastening device 220 in one exemplary embodiment, but may be attached and integrated with the fastening device 220 in another exemplary embodiment.

Figure 10:
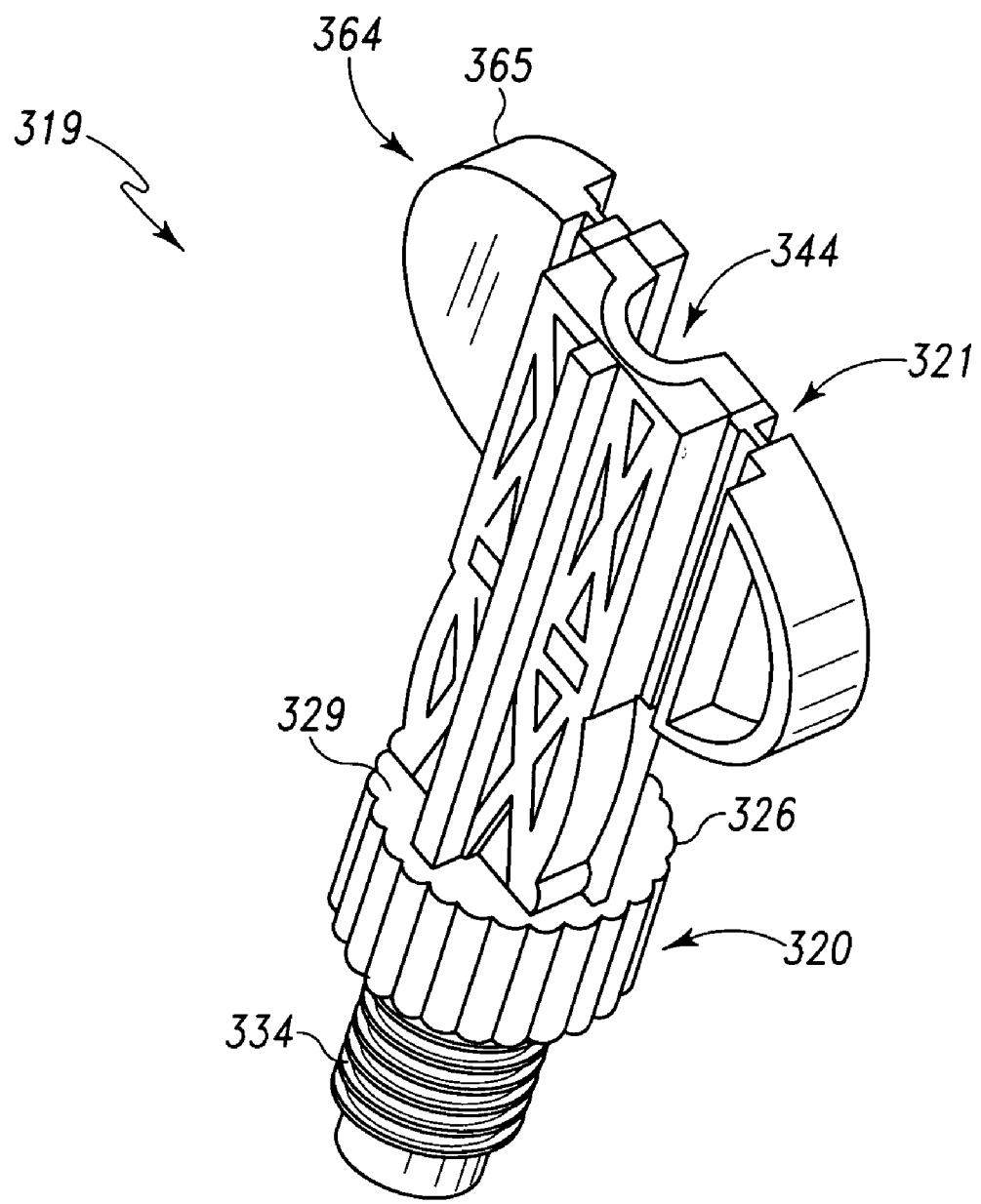
FIG. 10 illustrates a front isometric view of an exemplary embodiment of an apparatus having a fastening device and a tool with the tool having extension members.

As shown in the exemplary embodiment of FIG. 10, the apparatus 319 once again can include a fastening device 320 and a tool 321. The fastening device 320 includes a body 326, a fastening member 334 and a channel 344 (this channel 344 is more clearly illustrated in FIG. 12). The channel 344 substantially extends through the body 326 and the fastening member 334. The tool 321 includes a first end 358 and a second end 360. The second end 360 includes at least one extension member 364 (this extension member 364 herein is similar to the design shown in FIGS. 1-9). The tool 321 is configured to interface with an upper surface 329 of the body 326 of the fastening device 320 and allows the user to rotate the fastening device 320 to apply up to a predetermined force to operably fasten the fastening device 320 to an object (not depicted). The extension member 364 is configured to change orientation with respect to the tool 321 at the predetermined force. As illustrated in FIG. 10, the tool 321 (i.e., turn key device) is inserted into a recessed region 366 (see FIG. 12) in the upper surface 329 of the fastening device 320 permitting the user to operably rotate the extension member 364 (i.e., winged member 365). Once the predetermined force is applied to the tool 321, the extension member 364 changes orientation with respect to the tool 321. For example, the extension member 364 will either bend and/or break away from the remainder of the tool 321. As illustrated in the exemplary embodiments of FIGS. 10-12, the tool 321 can have two extension members 364.

Figure 11:
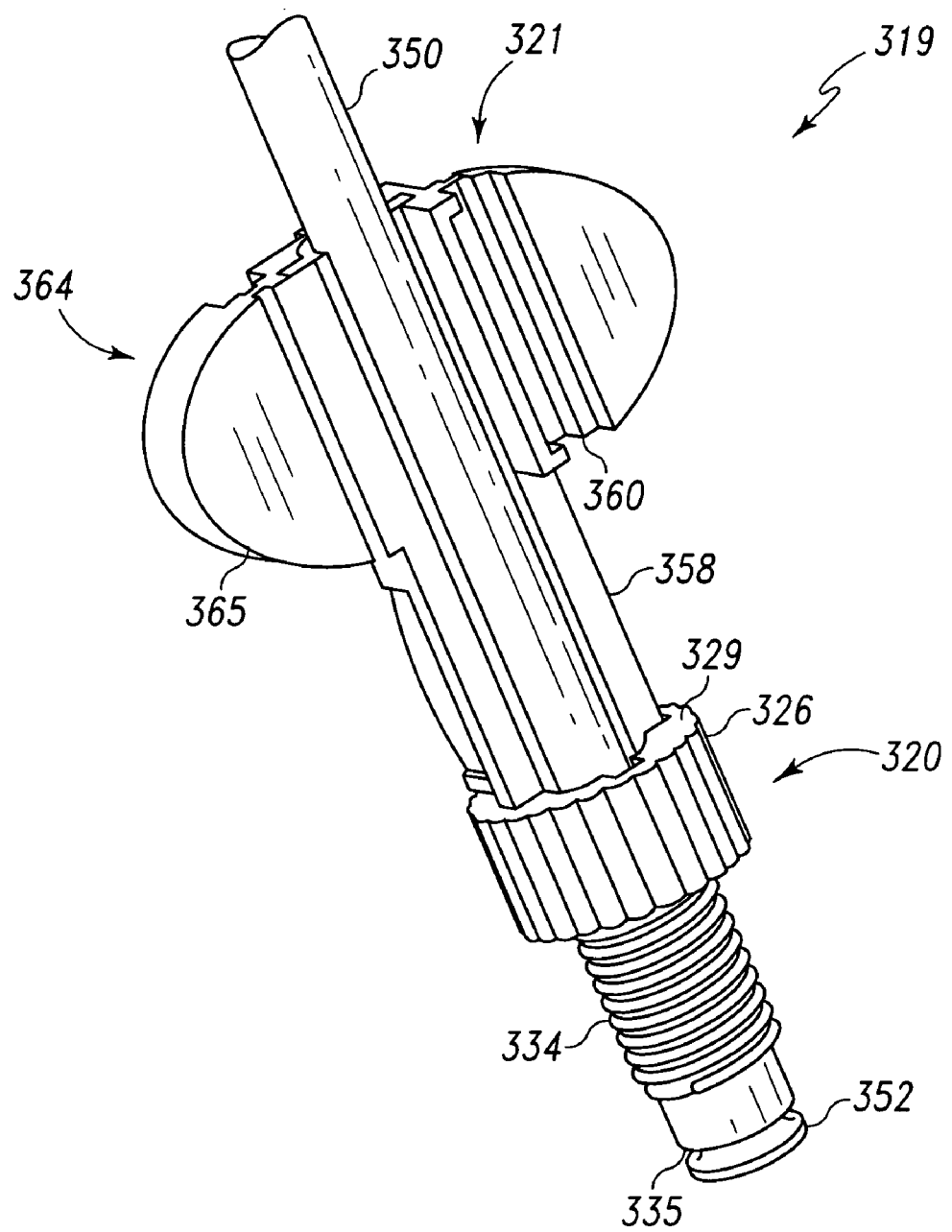
FIG. 11 depicts a rear isometric view of an exemplary embodiment of an apparatus having a fastening device and a tool with a tubular device extending through a channel within the fastening device.
Figure 12:
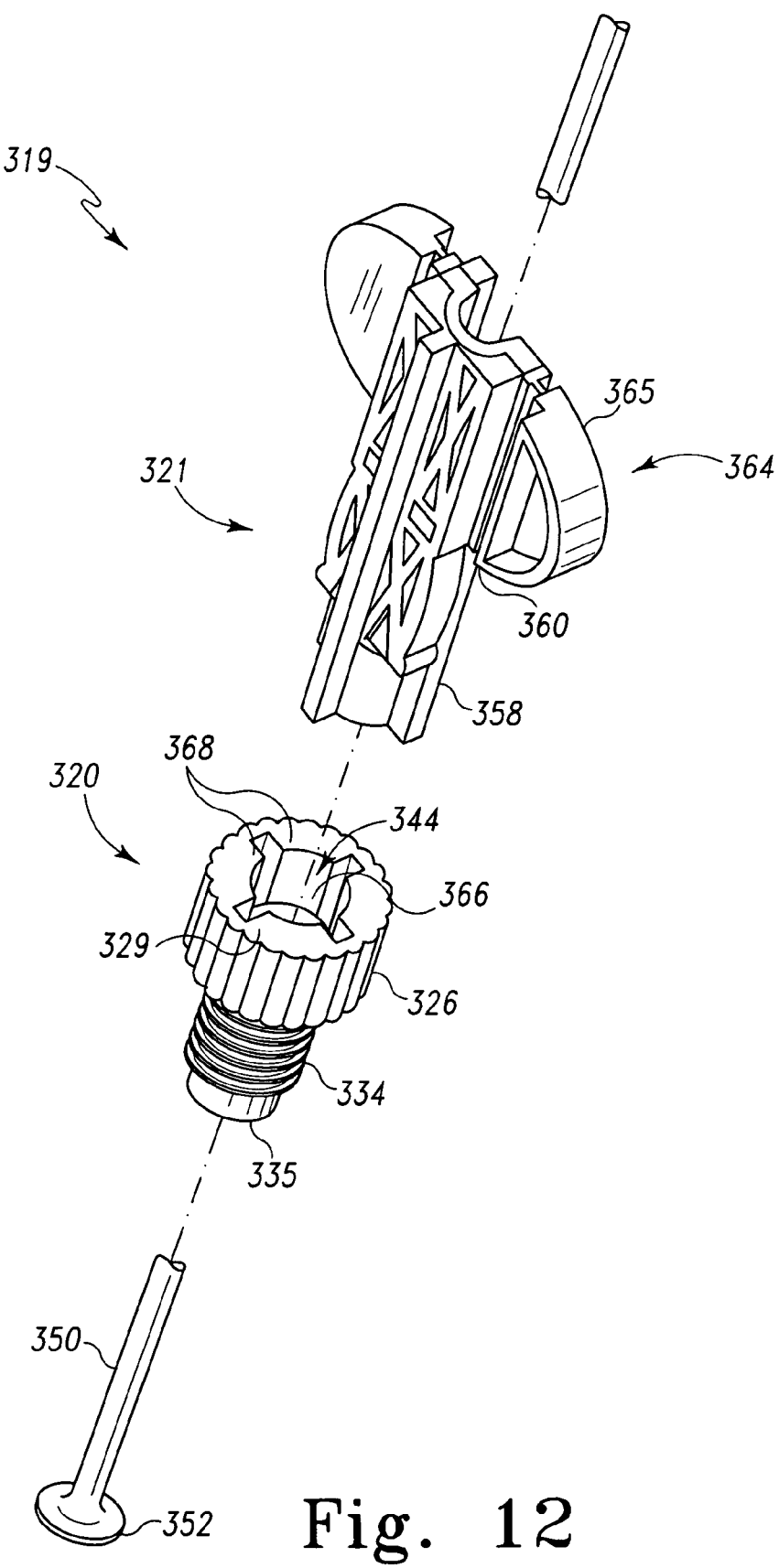
FIG. 12 depicts an exploded view of FIG. 11 illustrating a recessed region associated with the fastening device.

As further illustrated in FIGS. 11 and 12, the apparatus 319 can include a tubular device 350 which is inserted into the channel 344. The tubular device 350 includes a flanged end 352 which contacts an end surface 335 of the fastening member 334 and provides a seal between the fastening device 320 and the object that it will attach to. As more distinctly shown in the exploded view of the exemplary embodiment of FIG. 12, the recessed region 366 in the upper surface 329 of the body 326 has inward members 368. These inward members 368 extend into the recessed region 366 and provide the contact points with the first end 358 of the tool 321 such that the first end 358 bears against these inward members 368 as the tool 321 is rotated by the user.

In another exemplary embodiment similar to those shown in FIGS. 10-12, an apparatus (not shown) includes a fastening device and a tool. The fastening device includes a body and a fastening member. The body has an upper surface which includes a recessed region and inward members extending into the recessed region. The inward members provide the bearing surfaces on which the first end of the tool bears against when the tool is rotated by the user. In this exemplary embodiment, the inward members are configured to change orientation with respect to the fastening device as opposed to the winged members on the tool. When a predetermined force is reached in order to operably fasten the fastening device to an object, the inward members change orientation, which means that the inward members will bend or break away from the upper surface of the body. Once again, this will inform the user when the predetermined force (i.e., torque) has been reached, thus indicating that the fastening device has been appropriately attached to the designated object.

It is important to note, that the fastening devices and apparatuses indicated herein can be made of a variety of materials. Moreover, components are described as being able to change orientation when placed under a predetermined force are made of materials (i.e., plastics) which can permit such a bending or breaking of the designated component.

While the invention has been so described in detail with reference to specific embodiments thereof, it will be apparent to those skilled in the art that various changes and modifications may be made therein without departing from the spirit of the invention, the scope of which is defined by the following claims.

We claim:

1. A fastening device comprising an upper portion and a lower portion attached to the upper portion, wherein:
   the upper portion comprises a body and an extension member attached to an outer surface of the body;
   the lower portion comprises a fastening member configured to attach the fastening device to an object;
   the extension member is configured to bend or break away from the body when more than a predetermined force is applied to the extension member to rotate the fastening device; and
   the upper portion and the lower portion are configured such that less than the predetermined force applied to the extension member causes rotation of the fastening device and more than the predetermined force applied to the extension member causes the extension member to bend or break away from the body and fails to cause substantial rotation of the fastening device.

2. The fastening device of claim 1, wherein the fastening member comprises a threaded portion.

3. The fastening device of claim 1, wherein the upper portion comprises two extension members attached to the outer surface of the body.

4. The fastening device of claim 3, wherein the two extension members are positioned on substantially opposing sides of the outer surface of the body.

5. The fastening device of claim 1, wherein the extension member has a predetermined thickness.

6. The fastening device of claim 1, wherein the predetermined force ranges from about 15 in-oz to about 40 in-oz.

7. The fastening device of claim 1, wherein the fastening device comprises a channel substantially extending from the upper portion through the lower portion.

8. The fastening device of claim 7, wherein the channel is configured to contain a tube.

9. The fastening device of claim 8, wherein the tube is configured to extend beyond the channel of the fastening member to interface with the fastening member to form a seal when the fastening member is operably fastened to the object.

10. The fastening device of claim 1, wherein the fastening device further comprises a sealing member.

11. A system comprising a fastening device of claim 1.

12. An apparatus comprising a fastening device and a tool, wherein:
    the fastening device comprises a body, a fastening member, and a channel;
    the channel extends substantially through the body and the fastening member;
    the tool comprises a first end and a second end and is configured to interface with the body of the fastening device and allow a user to apply up to a predetermined force to the second end of the tool to rotate the apparatus so as to operably fasten the fastening device to an object;
    the second end of the tool is configured to bend or break away from the tool when more than the predetermined force is applied to the second end; and
    the apparatus is configured such that less than the predetermined force applied to the second end of the tool causes rotation of the apparatus and more than the predetermined force applied to the second end of the tool causes the second end to bend or break away from the tool and fails to cause substantial rotation of the apparatus.

13. The apparatus of claim 12, wherein the second end extends beyond the body of the fastening device.

14. The apparatus of claim 12, wherein the body comprises an upper surface having a recess configured to interface with the tool.

15. The apparatus of claim 12, wherein the second end comprises a slit extending along at least one surface of the second end.

16. An apparatus comprising a fastening device and a tool, wherein:
    the fastening device comprises a body, a fastening member, and a channel;
    the channel extends substantially through the body and the fastening member;
    the tool comprises a first end and a second end, the second end comprising at least one extension member;
    the tool is configured to interface with the body of the fastening device and allow a user to apply up to a predetermined force to the extension member to rotate the apparatus so as to operably fasten the fastening device to an object;
    the extension member is configured to bend or break away from the tool when more than the predetermined force is applied to the extension member; and
    the apparatus is configured such that less than the predetermined force applied to the extension member causes rotation of the apparatus and more than the predetermined force applied to the extension member causes the extension member to bend or break away from the tool and fails to cause substantial rotation of the apparatus.

17. An apparatus comprising a fastening device and a tool, wherein:
    the fastening device comprising a body and a fastening member;
    the body comprises an upper surface;
    the upper surface comprises a recessed region and inward members extending into the recessed region;
    the tool comprises a first end and a second end and is configured to interface with the inward members of the body to allow a user to apply up to a predetermined force to the inward members to rotate the apparatus so to operably fasten the fastening device to an object;
    a channel extends substantially through the fastening device and the tool, the inward members are configured to bend or break away from the body when more than the predetermined force is applied to the inward members; and
    the apparatus is configured such that less than the predetermined force applied to the inward members causes rotation of the apparatus and more than the predetermined force applied to the inward members causes the inward members to bend or break away from the body and fails to cause substantial rotation of the apparatus.

18. The apparatus of claim 17, wherein the channel is configured to contain a tube.

19. The apparatus of claim 18, wherein the tube is configured to extend beyond the channel of the apparatus to interface with the fastening member to form a seal when the fastening member is operably fastened to the object.

* * * * *

UNITED STATES PATENT AND TRADEMARK OFFICE
CERTIFICATE OF CORRECTION

PATENT NO. : 7,299,725 B2 Page 1 of 1
APPLICATION NO. : 11/369532
DATED : March 7, 2006
INVENTOR(S) : Helstern et al.

It is certified that error appears in the above-identified patent and that said Letters Patent is hereby corrected as shown below:

Title page,
Item (75) Inventors: line 3 "Charles E. Duheis" should read --Charles E. Dubois--;

Column 5, line 35 "22G" should read --220--.

Signed and Sealed this

Third Day of June, 2008

JON W. DUDAS
*Director of the United States Patent and Trademark Office*

UNITED STATES PATENT AND TRADEMARK OFFICE
CERTIFICATE OF CORRECTION

PATENT NO. : 7,299,725 B2 Page 1 of 1
APPLICATION NO. : 11/369532
DATED : November 27, 2007
INVENTOR(S) : Helstern et al.

It is certified that error appears in the above-identified patent and that said Letters Patent is hereby corrected as shown below:

Title page,
Item (75) Inventors: line 3 "Charles E. Duheis" should read --Charles E. Dubois--;

Column 5, line 35 "22G" should read --220--.

This certificate supersedes the Certificate of Correction issued June 3, 2008.

Signed and Sealed this

First Day of July, 2008

JON W. DUDAS
*Director of the United States Patent and Trademark Office*